Oct. 13, 1953   R. D. CAMPBELL   2,654,943
METHOD FOR THE MANUFACTURE OF IMPELLERS AND THE LIKE
Filed Aug. 30, 1949   2 Sheets-Sheet 1
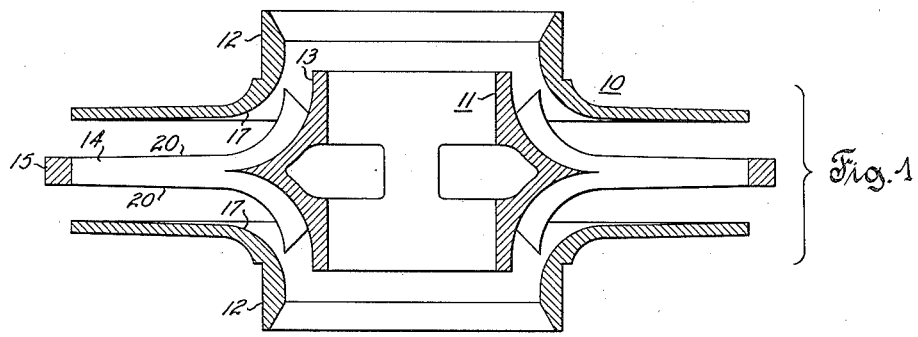
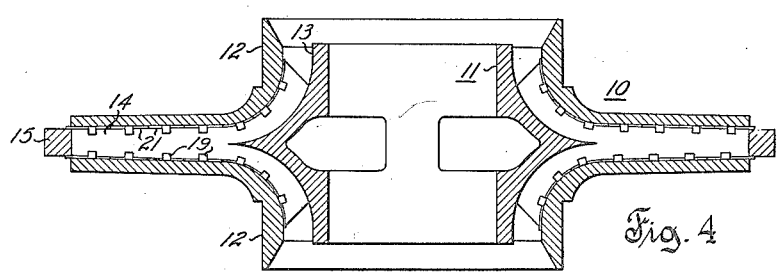
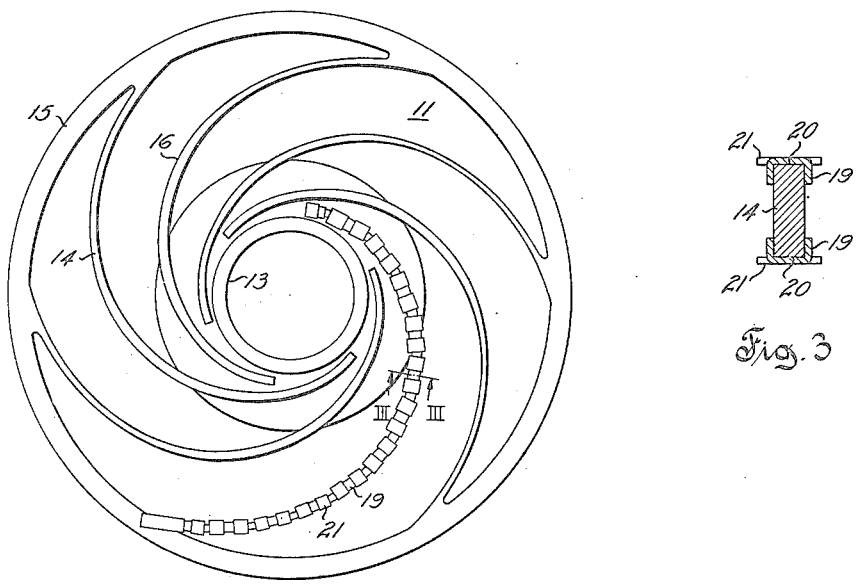
Inventor
Richard D. Campbell
Wayne B. Easton
by Attorney Patented Oct. 13, 1953

2,654,943

UNITED STATES PATENT OFFICE 2,654,943

METHOD FOR THE MANUFACTURE OF IMPELLERS AND THE LIKE

Richard D. Campbell, Hartland, Wis., assignor to Allis-Chalmers Manufacturing Company, Milwaukee, Wis., a corporation of Delaware Application August 30, 1949, Serial No. 113,228

5 Claims. (Cl. 29—156.8)

This invention relates to the manufacture of impellers and more particularly to a method for assembling an impeller by brazing; and the principal object is to provide a new and improved method and apparatus for fabricating impellers and the like. Impellers embodying the invention may be used, for example, in centrifugal pumps and compressors and the like.

Broadly this invention comprises the fabrication of an impeller assembly by a brazing method and is specifically concerned with the shapes of the component parts of such assembly, to means for heating such assembly during the brazing operation, to means for cooling such assembly after the brazing operation, and to means for preventing warping of the impeller during the entire operation.

Another object of this invention is to provide the component parts of an impeller, which are to be joined together and comprise the finished impeller, of such shape as to permit respective joining by brazing without using a fixture or the like to position such parts.

Another object of this invention is to provide novel support means for preventing the vanes, of an impeller which is to be fabricated by brazing, from warping or becoming distorted during the brazing operation.

Another object of this invention is to prevent warping and distortion, in an impeller to be fabricated by brazing, by providing novel means for uniformly heating the impeller assembly during the brazing operation.

Another object of this invention is to prevent cracking and distortion of an impeller due to unequal cooling thereof, after said impeller has been raised to the brazing temperature, by providing novel means for uniformly cooling such impeller from the brazing temperature.

Another object of this invention is to provide apparatus for the uniform cooling of an impeller fabricated by brazing.

The novel features of the invention and how the objects are attained will appear more fully from this specification and the accompanying drawing showing one embodiment of the invention and forming a part of this application, and all these novel features are intended to be pointed out in the claims.

In the drawing:

Fig. 1 is a sectional elevation of a vaned hub member together with two shroud members shown adjacent the positions they are to occupy when brazed to the hub member;

Fig. 2 is a plan view of the vaned hub member shown in Fig. 1 with short strips of brazing material shown on the mating surface of one of the vanes;

Fig. 3 is a section, taken as indicated by the line III—III in Fig. 2, showing how the strips of brazing material are temporarily fastened to the vanes;

Fig. 4 is a sectional elevation showing the vaned hub member and the two shroud members, assembled prior to the brazing operation, with strips of brazing material between their respective mating surfaces;

Figure 5:
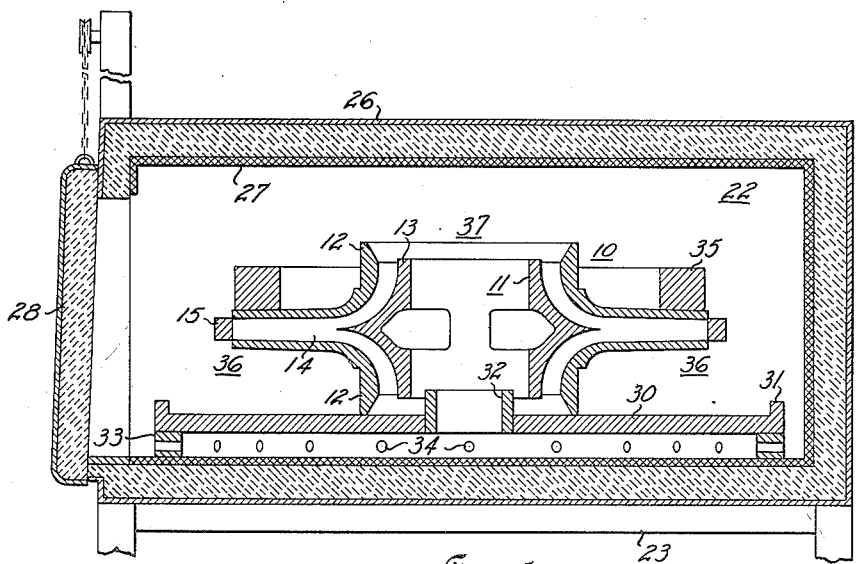
Fig. 5 is a sectional elevation showing the assembled impeller positioned in a furnace ready for the brazing operation.

A specific embodiment of my new and improved method for fabricating impellers is herebelow described with reference to the drawings.

Figs. 1 to 4 show the component parts of an impeller 10 comprising a vaned hub member 11 and shroud members 12. The vaned hub member 11 has a hub portion 13 with vanes 14 attached rigidly thereto, such vanes being peripherally braced by means of strut portions respectively bridging each pair of adjacent vanes and such strut portions are herein characterized by a ring member 15 peripherally attached to the tips of the vanes. The fluid engaging or impelling surfaces 16 (Fig. 2) of the vanes 14 may have any contour desired and is determined by the impelling problem involved. Shrouds 12 are to be joined to the vanes 14 by brazing with inner mating surface 17 of each of the shrouds being formed with a contour which is complementary to respective mating surfaces 20 on the vanes. It is to be noted, as a pertinent part of this invention, that the contours of the respective surfaces 17 and 20 are formed so that the vaned hub member 11 and the shrouds 12 are maintained in coaxial relationship, without the aid of fixtures or clamps and the like to hold them in this position, when assembled for the brazing operation.

As seen in Figs. 1, 4, 5 and 6, the outer diameter of the shrouds 12 is substantially the same as the inside diameter of the ring member 15. The purpose of the ring member 15 is to rigidly support the relatively thin vanes 14 in their respective positions to prevent warping and distortion thereof during the welding operation. It is well understood in the art that even slight deviations of vanes from their calculated positions can cause lowering of the performance characteristics of an impeller.

In this instance the component parts of the impeller are composed of Monel metal, the brazing material is silver solder and an external flux is used. However, it is to be understood that the composition of the impeller parts and the kind of brazing material and flux used are not pertinent to the method herein disclosed; their mention here serves only to provide a complete and specific disclosure of one embodiment of my novel method.

In this instance the vaned hub member 11 and shrouds 12 are cleaned and flux is applied to the surfaces 17 and 20. Short strips of silver solder 21 are laid along the vane surfaces 20 and tabs 19 are made in the center of each strip for temporarily holding the solder strips to the vanes. The vaned hub member 11 and shrouds 12 are assembled with the silver solder strips 21 interposed between the respective mating surfaces 17 and 20 and the brazing operation is accomplished by applying heat to the members 11 and 12 such that the temperature thereof is raised sufficiently to fuse the brazing material and effect a connection between the mating surfaces. The heat may be applied to the members in any manner known in the art of brazing and the heat applying means in this instance is herein characterized by an electric brazing furnace 22 shown schematically in Fig. 5. A base member 23 supports the furnace 22 which has a lining comprising firebrick 24 and is enclosed by a metal casing 26. The furnace 22 may be opened in any convenient manner, such as by an end door 28. The interior of the furnace is provided with electrical heating elements 27 of the proper capacity to bring the furnace up to the proper brazing temperature. The furnace 22 is of the controlled atmosphere type such that a reducing atmosphere may be maintained which prevents oxidation and also removes oxidation and scale from the surfaces of the articles to be brazed therein.

The assembled impeller members are placed on an annular plate or tray member 30 prior to being placed in the furnace 22 for the brazing operation. The tray member 30 has an outer annular lip 31 which serves to prevent excess brazing material from running onto the floor of the furnace, an inner annular lip forming an aperture 32 which has a function in cooling the impeller after the impeller is removed from the furnace, and support ring 33, having circumferentially spaced radial ports 34, which also has a function in the subsequent cooling of the impeller after removal from the furnace.

Prior to placing the tray member 30, with the assembled members 11 and 12 placed thereon, into the furnace 22, a mass ring 35 is concentrically laid on top of the assembled members. The ring 35 is relatively massive and has an outside diameter substantially the same as the diameter of the shrouds 12. The other dimensions of the ring 35 are proportioned relative to the size and shape of the impeller 10 such that the rate of temperature rise in the impeller rim portions 36, indicated generally in Figs. 5 to 7, during the brazing operation, approximates the rate of temperature rise in the impeller hub portion 37, also indicated generally in Figs. 5 to 7. The advantages of attaining uniform heating to prevent distortion are well understood. The tray member 30 and assembled members 11 and 12 are placed in the furnace 22 after the furnace has been preheated and in this particular instance due to the type of brazing material (silver solder), the metal of which the impeller 10 is composed (Monel metal), and the size and shape of the impeller, it was discovered that satisfactory brazing results were obtained by preheating the furnace to a temperature of 1600° F. and keeping the impeller in the furnace for fifteen minutes thereafter. This temprature and brazing time of course varies when the factors mentioned above vary.

The manner of cooling an impeller assembly after the brazing operation is critical in that an impeller comprises relatively thick and thin sections and thus has a tendency to warp upon cooling. I have provided novel means for attaining overall uniform cooling as will be shown.

Figure 6:
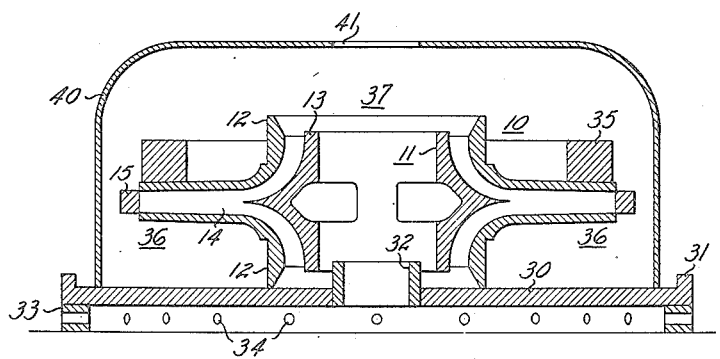
Fig. 6 is a sectional elevation showing an arrangement for uniformly cooling the impeller after it has been removed from the furnace.
Figure 7:
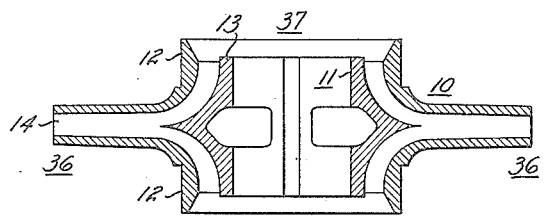
Fig. 7 is a sectional elevation showing the finished brazed impeller.

The tray member 30, with the now brazed impeller 10 thereon, is removed from the furnace 22 and a cooling cover member 40 is placed on the tray member such that it encloses the impeller as shown in Fig. 6. The function of the cover member 40 is to induce uniform cooling of the impeller 10. An aperture 41 is located in the cover member 40 such that it is over the impeller hub portion 37 and as the hub portion 37 is relatively more massive than the rim portions 36 more heat must be taken therefrom to induce it to cool at the same rate as the rim portions. As the tray member 30 is elevated by the support ring 33 cooling air circulates through the circumferential ports 34, through the tray aperture 32, up through the center of the hub portion 37, and to the atmosphere through the cover aperture 41. The cover aperture 41 is formed of such size relative to the shape of the impeller 10 so as to permit sufficiently more heat to be removed from the hub portion 37 than from the rim portions 36. This arrangement allows the portions 36 and 37 to decrease in temperature at substantially the same rate during the cooling process. Determination of whether uniform cooling is being attained may be checked by attaching thermocouples to the portions 36 and 37 and any deviation in temperature between the two portions may be corrected by manipulation of the ports 34 in the support ring 33. If, for example, the hub portion 37 is found to be cooling too fast the ports 34 may be made smaller or some may be plugged to reduce the amount of cooling air which flows through the center of the hub portion 37.

After the impeller 10 has cooled the strut portions, herein characterized by the ring member 15, are removed from the periphery of the impeller by machining as the final step in my new and improved method for fabricating impellers.

From the foregoing it will be apparent to those skilled in the art that the illustrated embodiment of the invention provides a new and improved method for the fabrication of an impeller or the like by brazing to provide an integral article and accordingly accomplishes the objects of the invention. On the other hand, it will also be obvious to those skilled in the art that the illustrated embodiment of the invention may be variously changed and modified, or features thereof, singly or collectively, embodied in other combinations than those illustrated, without departing from the spirit of the invention, or sacrificing all of the advantages thereof, and that accordingly the disclosure herein is illustrative only, and the invention is not limited thereto.

It is claimed and desired to secure by Letters Patent:

1. In a process for manufacturing a centrifugal impeller, the steps of forming a hub member having a series of circumferentially spaced vanes projecting outward therefrom in symmetrical relation to the axis of rotation of said member and merging with a continuous vane tip encompassing ring coaxially disposed relative to said member, each said vane presenting axially oppositely facing edge surfaces; forming a pair of similar shroud elements each having a central portion merging with a radially outward projecting annular flange, said central portion and said flange presenting inner surfaces coextensively complementary in contour to said edge surfaces of said vanes; positioning said shroud elements on opposite sides of said hub member, said inner surfaces of each of said shroud elements being disposed in edge abutting coextensive engagement with said oppositely facing edge surfaces of said vanes; fusably uniting the engaged portions of said edge and inner surfaces; and severing said ring to provide unobstructed openings between adjacent vanes at the periphery of said impeller.

2. In a process for manufacturing a centrifugal impeller, the steps of forming a hub member having a substantially cylindrical peripheral surface and having a series of circumferentially spaced vanes projecting outward from said surface in symmetrical relation to the axis of rotation of said member and presenting tip portions merging with a continuous vane tip encompassing ring coaxially disposed relative to said member, each said vane presenting axially oppositely facing edge surfaces intermediate said hub members and said ring; forming a pair of similar shroud elements each having a central portion merging with a radially outward projecting annular flange, said central portion and said flange presenting inner surfaces coextensively complementary in contour to said edge surfaces of said vanes; positioning said shroud elements on opposite sides of said hub member in spaced passage forming relation therewith, said inner surfaces of each of said shroud elements being disposed in edge abutting coextensive engagement with said oppositely facing edge surfaces of said vanes; fusably uniting the engaged portions of said edge and inner surfaces; and severing said ring to provide unobstructed openings between adjacent vanes at the periphery of said impeller.

3. In a process for manufacturing a centrifugal impeller, the steps of forming a hub member having a substantially cylindrical peripheral surface and having a series of circumferentially spaced vanes, each said vane presenting axial oppositely facing edge surfaces and having tip portions projecting outward from said surface in symmetrical relation to the axis of rotation thereof to merge with a continuous vane tip encompassing ring of a predetermined internal diameter, said ring being coaxially disposed relative to said member; forming a pair of similar shroud elements each having an external diameter substantially equal to said internal diameter of said ring and each having a central portion merging with a radially outward projecting annular flange, said central portion and said flange presenting inner surfaces coextensively complementary in contour to said edge surfaces of said vanes; positioning said shroud elements on opposite sides of said hub member in coaxial relation therewith, said inner surfaces of each of said shroud elements being disposed in edge abutting coextensive engagement with said oppositely facing edge surfaces of said vanes; fusably uniting the engaged portions of said edge and inner surfaces; and severing said ring to provide unobstructed openings between adjacent vanes at the periphery of said impeller.

4. In a process for manufacturing a centrifugal impeller, the steps of forming a hub member having a substantially cylindrical peripheral surface and having a series of circumferentially spaced vanes, each said vane presenting axial oppositely facing edge surfaces and having tip portions of a predetermined axial dimension projecting in a direction outward from said surface in symmetrical relation to the axis of rotation thereof to merge with a continuous vane tip encompassing ring having a predetermined internal diameter and having an axial dimension commensurate with said predetermined axial dimension of said vane tip, said ring being coaxially disposed relative to said member; forming a pair of similar shroud elements each having a central portion merging with a radially outward projecting annular flange, said central portion and said flange presenting inner surfaces coextensively complementary in contour to said edge surfaces of said vanes; positioning said shroud elements on opposite sides of said hub member in spaced passage forming relation therewith, said inner surfaces of each of said shroud elements being disposed in edge abutting coextensive engagement with said oppositely facing edge surfaces of said vanes; fusably uniting the engaged portions of said edge and inner surfaces; and severing said ring to provide unobstructed openings between adjacent vanes at the periphery of said impeller.

5. In a process for manufacturing a centrifugal impeller, the steps of forming a hub member having a substantially cylindrical peripheral surface and having a series of circumferentially spaced vanes, each said vane presenting axial oppositely facing edge surfaces and having tip portions of a predetermined axial dimension projecting in a direction outward from said surface in symmetrical relation to the axis of rotation thereof to merge with a continuous vane tip encompassing ring having a predetermined internal diameter and having an axial dimension commensurate with said predetermined axial dimension of said vane tip, said ring being coaxially disposed relative to said member; forming a pair of similar shroud elements each having an external diameter substantially equal to said internal diameter of said ring and each having a central portion merging with a radially outward projecting annular flange, said central portion and said flange presenting inner surfaces coextensively complementary in contour to said edge surfaces of said vanes; positioning said shroud elements on opposite sides of said hub member in coaxial and spaced passage forming relation therewith, said inner surfaces of each of said shroud elements being disposed in edge abutting coextensive engagement with said oppositely facing edge surfaces of said vanes; fusably uniting the engaged portions of said edge and inner surfaces; and severing said ring to provide unobstructed openings between adjacent vanes at the periphery of said impeller.

RICHARD D. CAMPBELL.

References Cited in the file of this patent

UNITED STATES PATENTS

| Number | Name | Date |
|---|---|---|
| 529,689 | Anderson | Nov. 27, 1894 |
| 1,016,457 | Totten | Feb. 6, 1912 |
| 1,391,907 | Schaffer | Sept. 27, 1921 |
| 1,777,764 | Olson | Oct. 7, 1930 |
| 2,000,692 | Dimberg | May 7, 1935 |
| 2,179,556 | Lysholm | Nov. 14, 1939 |
| 2,303,467 | Inskeep | Dec. 1, 1942 |
| 2,305,811 | Oeckl | Dec. 22, 1942 |
| 2,310,841 | Curtis | Feb. 9, 1943 |
| 2,402,204 | Phelan | June 18, 1946 |
| 2,440,692 | Kruse | May 4, 1948 |
| 2,454,580 | Thielemann | Nov. 23, 1948 |
| 2,510,718 | Schieber | June 6, 1950 |